F. G. UNDERWOOD.
INTERNAL COMBUSTION ENGINE.
APPLICATION FILED JAN. 15, 1916.
1,233,622.
Patented July 17, 1917.
2 SHEETS—SHEET 2.
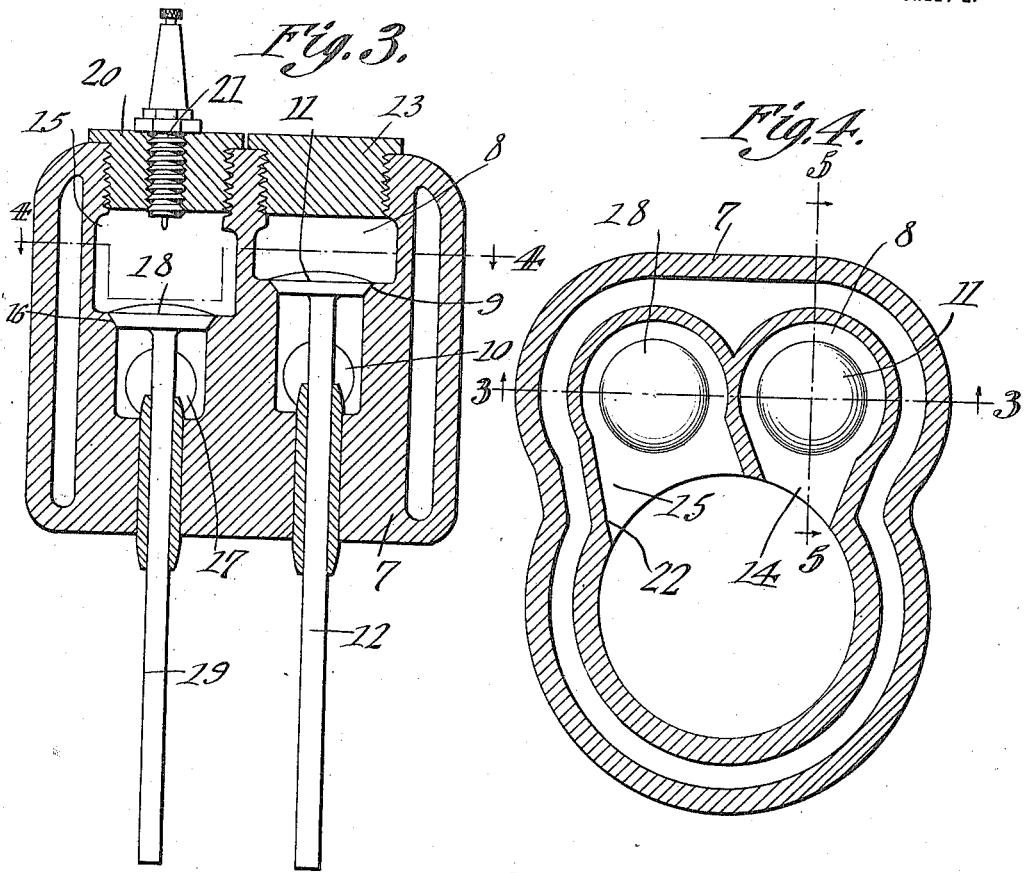
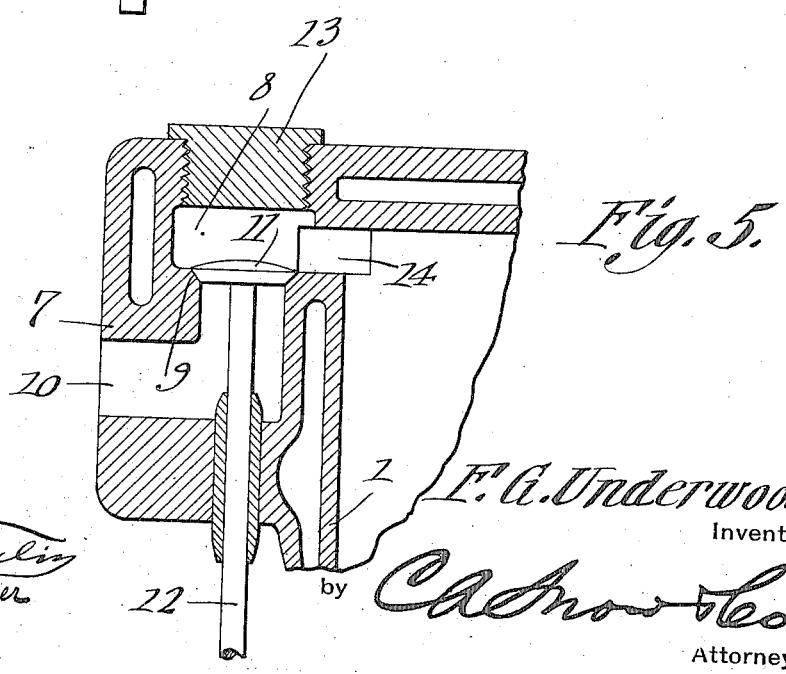
Witnesses
F. G. Underwood
Inventor
by
Attorneys

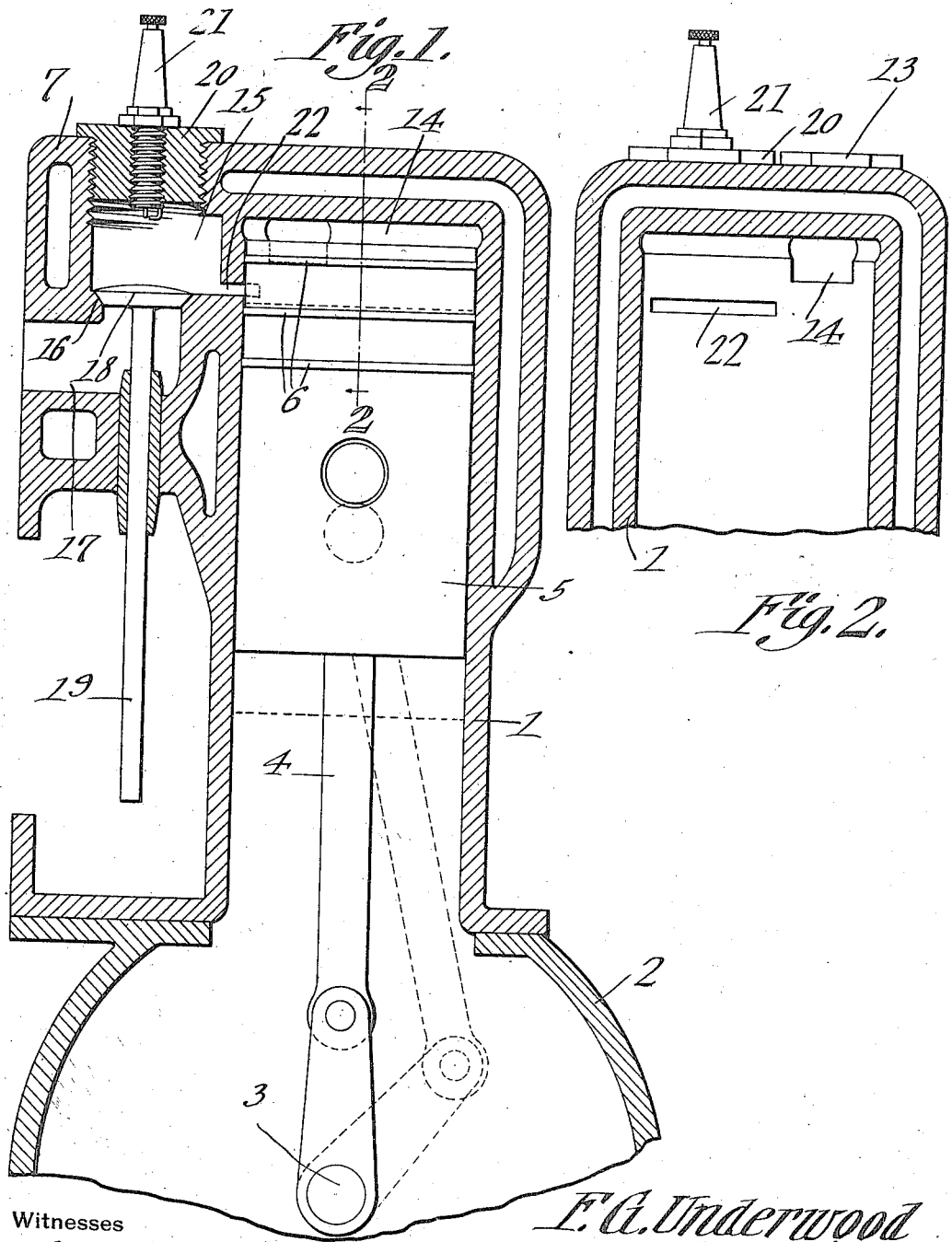

UNITED STATES PATENT OFFICE.

FRANK GENE UNDERWOOD, OF MINNEAPOLIS, MINNESOTA.

INTERNAL-COMBUSTION ENGINE.

1,233,622.

Specification of Letters Patent.   Patented July 17, 1917.

Application filed January 15, 1916.   Serial No. 72,277.

*To all whom it may concern:*

Be it known that I, FRANK G. UNDERWOOD, a citizen of the United States, residing at Minneapolis, in the county of Hennepin and State of Minnesota, have invented a new and useful Internal-Combustion Engine, of which the following is a specification.

The present invention appertains to internal combustion engines, and aims to provide an explosion engine having novel and improved means for firing the charge within the cylinder, whereby a charge is fired at such a time, that the least amount of heat is consumed by the walls of the cylinder and water jacket, and in order that maximum power is obtained, with a minimum amount of wasted energy.

Manufacturers of internal combustion engines have from the beginning been striving to provide an engine wherein the charge within the cylinder is fired at such a time, that the greatest possible efficiency is obtained, the heat absorbed by the cylinder walls and water jacket being as small as possible, and the expansion of the burning gases occurring as nearly as possible at such a position of the crank that the greatest possible power is obtained. It is the common practice of engine builders to fire the charge when the crank is at or near dead center, that is, in or immediately adjacent the axis of the cylinder, in order that when the crank reaches a proper point, the greatest effort of the burning charge will be obtained for propelling the crank. The firing of the charge is advanced, in order to enable the charge to start burning throughout before the crank reaches the desired angle, in which event the maximum expansive power of the burning charge occurs. This method is wasteful, in that the charge is burning before the crank reaches the proper angle, and energy is lost by the absorption of heat by the walls of the cylinder and the water jacket, and the loss thus resulting from the premature burning of the charge decreases the efficiency of the engine.

It was the intention of applicant, in devising this invention, to eliminate as much as possible the firing of the charge until the crank has reached the proper point when the power created by the burning charge will be most effective. This has been accomplished by providing the cylinder with an intake pocket communicating with the interior of the cylinder by a port which is covered by the piston when the piston reaches the end of its compression stroke, therefore imprisoning a small portion of the gas within said pocket, and the gas within said pocket being ignited just before the piston recedes from the head sufficiently to uncover said port. Thus, the gas within the pocket is ignited, and as soon as the end of the piston passes said port, the burning gas within said pocket being under compression will expand in a fan-shaped stream through said port and across the end of the cylinder, so as to quickly and effectively ignite the entire charge within the cylinder, in order that the charge will burn quickly. This will reduce to a minimum the amount of heat absorbed by the cylinder walls and water jacket, to eliminate as much as possible wasted energy, and the explosion will provide a quick or sudden impulse being given the piston at the proper moment, whereby the crank is propelled with greatest effort. This provides for a maximum efficiency. The main charge is not ignited until the crank is advanced well, whereby the charge in being burnt will properly propel the crank. The burning gas within the pocket in passing through the port into the cylinder will assist in actuating the piston, so that the gas which burns within said pocket will not be wasted, and the pocket being of small proportions will reduce to a minimum the absorption of heat by the walls of said pocket.

It is also the object of the invention to provide an internal combustion engine having the characteristics above noted, and which is comparatively simple and inexpensive in construction without entailing radical or prohibitive alterations in present day engines.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a vertical section through one cylinder of an internal combustion engine, illustrating the improvements.

Fig. 2 is a sectional view of the cylinder taken on the line 2—2 of Fig. 1.

Fig. 3 is a section of the intake and exhaust structure taken on the line 3—3 of Fig. 4.

Fig. 4 is a section taken on the line 4—4 of Fig. 3.

Fig. 5 is a section on the line 5—5 of Fig. 4.

Although but a single cylinder is illustrated in the drawings, it is evident that the invention can be used on a multi-cylinder engine, so that no limitation in this respect is to be assumed. There is illustrated a cylinder 1 attached to a crank case 2, which incloses the crank shaft 3 connected by a connecting rod 4 with the piston 5 which reciprocates within the cylinder, said piston having the usual packing rings 6.

In carrying out the invention, the cylinder 1 is provided at one side and adjacent its head with an enlargement 7 provided with an exhaust chamber 8 having a valve seat 9 at its bottom and an outlet 10 below said valve seat. A puppet valve 11 is seatable on the seat 9 and has a downwardly projecting stem 12 adapted to be operated in the ordinary manner for unseating the valve 11 during the stroke of the piston that ejects the burnt gases. The enlargement 7 has a removable plug 13 above the valve seat 9 closing the chamber 8 and permitting of the insertion and removal of the valve 11 when the plug 13 is removed. The partition between the interior of the cylinder and exhaust chamber 8 is provided with an exhaust port 14 immediately adjacent the head of the cylinder and communicating with the lower portion of said chamber.

The enlargement 7 is provided with an intake chamber 15, the chambers 8 and 15 being disposed side by side, although they can be arranged at different positions about the cylinder without changing the result. The intake chamber 15 has a valve seat 16 at its bottom and an inlet 17 below said valve seat, a puppet valve 18 being seatable upon the seat 16 to shut off the inflow of carbureted air, and to serve as a check valve for preventing the gas from escaping from the chamber or pocket 15 back to the inlet 17. The puppet valve 18 has a downwardly projecting stem 19 adapted to be operated in the ordinary manner for unseating the valve 18 during the intake stroke of the piston according to common practice. The enlargement 7 has a removable plug 20 above the seat 16 closing the pocket 15 and permitting the valve 18 to be inserted and removed when the plug 20 is removed. The spark plug or igniter 21 is preferably threaded into the plug 20 for igniting the gas within the pocket 15 at the proper time. The partition between the pocket 15 and the interior of the cylinder is provided with an arcuate intake port 22 extending transversely of the cylinder, and spaced a suitable distance from the head of the cylinder, whereby when the piston 5 is in its outermost or uppermost position, the end thereof will move past the port 22, so that the piston closes said port, one packing ring 6 moving past the port 22 so that said port is sealed effectively. The port 22 is located at such a point that when the piston 5 recedes from the head of the cylinder with the crank arranged at the desired angle, the end of the piston 5 is just below or past the port 22, as indicated in dotted lines in Fig. 1. The intake port 22 is relatively narrow and is disposed transversely of the cylinder, and communicates with the lower or bottom portion of the intake chamber 15. The piston therefore quickly covers and uncovers the port 22 due to its being narrow and elongated transversely and this will also provide for the flow of the flame in fan-shape from the chamber 15 into the cylinder, to spread the burning gases throughout the area of the cylinder across the end of the piston when it advances. The bottom of the intake chamber 15 is spaced farther from the head of the cylinder than the bottom of the exhaust chamber.

The operation of the engine, in general, is the same as an ordinary four-cycle engine. During one movement of the piston away from the head of the cylinder, the suction created sucks in the carbureted air from the inlet 17, so that the carbureted air will fill the cylinder and pocket 15. Then, when the piston returns, it compresses the charge within the cylinder, and the gas within the pocket 15 will also be compressed. When the piston reaches the end of its compression stroke, it closes the port 22, as seen in Fig. 1, thereby confining the gas within the pocket 15, and further compressing the charge within the cylinder to the greatest density. Now, as the piston again recedes, the gas within the pocket 15 is fired by means of the spark plug 21, before the port 22 is uncovered, and the gas within said pocket will therefore tend to expand, and as soon as the piston starts to leave the port 22, the burning gases will escape with violent force through the port 22 and will pass across the end of the cylinder, thus igniting the main charge within the cylinder quickly and effectively throughout its area. The charge within the cylinder is thus ignited quickly and thoroughly, whereby a minimum amount of heat is absorbed by the cylinder walls and water jacket, and in order that the impulse given the piston will be quick and powerful to propel the crank at the point of greatest efficiency. The consumption of the charge is effected quickly, to reduce the amount of time that is necessary for the gas to burn, thereby reducing the amount of heat absorbed by the cylinder walls and water jacket, and also increasing the expansive force and power transmitted to the crank shaft.

Having thus described the invention, what is claimed as new is:

An engine embodying a cylinder having an enlargement at one side adjacent to its head, said enlargement being provided with intake and exhaust chambers disposed side by side, valve seats at the bottoms of said chambers, inlet and outlets below said seats and removable plugs for said chambers above said seats, the bottom of the intake chamber being spaced farther from the head of the cylinder than the exhaust chamber, the cylinder having partitions between the interior thereof and said chambers, one partition having an exhaust port adjacent to the head of the cylinder communicating with the lower portion of the exhaust chamber, the other partition having a narrow transversely elongated intake port spaced farther from the head of the cylinder than the exhaust port and communicating with the lower portion of the intake chamber, a piston working in the cylinder and movable past the intake port during the completion of its compression stroke to confine the explosive charge within the intake chamber until the piston has started through its power stroke, puppet valves seatable upon said valve seats, and a spark plug for igniting the confined charge within the intake chamber.

In testimony that I claim the foregoing as my own, I have hereto affixed my signature in the presence of two witnesses.

FRANK GENE UNDERWOOD.

Witnesses:
 WALTER R. VASHEDN,
 LEO P. KELLAR.